United States Patent
Han et al.

(10) Patent No.: US 11,636,699 B2
(45) Date of Patent: Apr. 25, 2023

(54) METHOD AND APPARATUS FOR RECOGNIZING TABLE, DEVICE, MEDIUM

(71) Applicant: BEIJING BAIDU NETCOM SCIENCE AND TECHNOLOGY CO., LTD., Beijing (CN)

(72) Inventors: Guangyao Han, Beijing (CN); Minhui Pang, Beijing (CN); Guobin Xie, Beijing (CN); Danqing Li, Beijing (CN); Tianyi Wang, Beijing (CN); Peiwei Zheng, Beijing (CN); Zeqing Jiang, Beijing (CN); Jin Zhang, Beijing (CN); Hongjiang Du, Beijing (CN)

(73) Assignee: BEIJING BAIDU NETCOM SCIENCE AND TECHNOLOGY CO., LTD, Beijing (CN)

( * ) Notice: Subject to any disclaimer, the term of this patent is extended or adjusted under 35 U.S.C. 154(b) by 191 days.

(21) Appl. No.: 17/118,403

(22) Filed: Dec. 10, 2020

(65) Prior Publication Data
US 2021/0383105 A1    Dec. 9, 2021

(30) Foreign Application Priority Data
Jun. 5, 2020 (CN) .......................... 202010508011.6

(51) Int. Cl.
*G06V 30/412* (2022.01)
*G06V 10/40* (2022.01)
(Continued)

(52) U.S. Cl.
CPC ............ *G06V 30/412* (2022.01); *G06V 10/40* (2022.01); *G06V 30/413* (2022.01); *G06V 30/414* (2022.01); *G06V 30/10* (2022.01)

(58) Field of Classification Search
CPC .... G06V 30/10; G06V 30/412; G06V 30/413; G06V 30/414; G06V 10/40
See application file for complete search history.

(56) References Cited

U.S. PATENT DOCUMENTS 9,858,476 B1 * 1/2018 Ming .................. G06V 30/414
11,200,413 B2 * 12/2021 Burdick .............. G06V 30/416
(Continued)

FOREIGN PATENT DOCUMENTS

| JP | H 10307888 | 11/1998 |
|----|------------|---------|
| JP | 2011123825 | 6/2011 |
| JP | 2020042754 | 3/2020 |

OTHER PUBLICATIONS

Huang, et al. (A YOLO-based Table Detection Method), pp. 813-818. (Year: 2019).*

(Continued)

*Primary Examiner* — Daniel G Mariam
(74) *Attorney, Agent, or Firm* — Knobbe, Martens, Olson & Bear, LLP

(57) ABSTRACT

Embodiments of the present disclosure relate to a method and apparatus for recognizing a table, a device, and a medium. An embodiment of the method can include: detecting a table on a target picture, to obtain a candidate table recognition result; extracting a merging feature of the candidate table recognition result, and determining a to-be-merged row in the candidate table recognition result based on the merging feature; extracting a direction feature of the to-be-merged row, and determining a merging direction of the to-be-merged row based on the direction feature; and adjusting the candidate table recognition result based on the to-be-merged row and the merging direction of the to-be-merged row, to obtain a target table recognition result.

17 Claims, 9 Drawing Sheets

(51) Int. Cl.
  *G06V 30/413* (2022.01)
  *G06V 30/414* (2022.01)
  *G06V 30/10* (2022.01)

(56) References Cited

U.S. PATENT DOCUMENTS

2009/0304282 A1  12/2009  Predovic et al.
2019/0340240 A1  11/2019  Duta

OTHER PUBLICATIONS

Xiang, Yao, et al., "A Novel Automation-Assisted Cervical Cancer Reading Method Based on Convolutional Neural Network", School of Computer Science and Engineering, Central South University, Changsha 410083, China, Publication date Dec. 14, 2019.
Extended European Search Report dated Sep. 21, 2021 for European Patent Application No. 21165648.3. 8 pages.
Huang et al., *A YOLO-based Table Detection Method*, 2019 International Conf on Document Analysis & Recognition (ICDAR), Inst of Comp Sci & Tech, Peking Univ, Beijing.

\* cited by examiner

| Project name | Related party | 2012 | 2011 |
|---|---|---|---|
| | | Thousand Yuan | Thousand Yuan |
| | | | (Restate) |
| Payable for related party | | | |
| Payable for engineering equipment | Company A | (100,456) | (268,597) |
| Payable for fuel | Company xxxx and other subsidiaries thereof Company xxxx and area B division | (68,431) | (4,586) |
| Payable for fuel | Company C | (963) | - |
| Payable for property management | Company D | (1,250) | - |
| Payable for CDM service | Company E | (787) | (787) |
| Payable for repairment | Company FFF and Company G | (45) | (621) |
| Payable for capacity index | Company H | (273,530) | (99,500) |
| Other payables | Company JJJ and Company K | (1,060) | (193,101) |
| Pre-collected of electricity sales rights | Company L | (10,000) | (10,000) |
| Shareholder loan | Company M Company N | (3,020,023) | (3,240,396) |
| Other loans | Company Q Company RRR and Company S | (7,155,305) | (6,986,085) |
| Finance lease payable | Company T | (227,500) | - |

Fig. 2

| Project name | Related party | 2012 Thousand Yuan | 2011 Thousand Yuan (Restate) |
|---|---|---|---|
| Payable for related party | | | |
| Payable for engineering equipment | Company A Company xxxx and other subsidiaries thereof | (100,456) | (268,597) |
| Payable for fuel | Company xxxx and area B division | (8,431) | (1,586) |
| Payable for fuel | Company C | (963) | – |
| Payable for property management | Company D | (1,250) | – |
| Payable for CDM service | Company E | (787) | (787) |
| Payable for repairment | Company FFF and Company G | (45) | (624) |
| Payable for capacity index | Company H | (273,530) | (99,500) |
| Other payables | Company JJJ and Company K | (1,060) | (193,101) |
| Pre-collected of electricity sales rights | Company L | (10,000) | (10,000) |
| Shareholder loan | Company M Company N | (3,020,023) | (3,240,396) |
| Other loans | Company Q Company RRR and Company S | (7,155,505) | (6,986,085) |
| Finance lease payable | Company T | (227,500) | – |

Fig. 3

| Project name | Related party | 2012 Thousand Yuan | 2011 Thousand Yuan (Restate) |
|---|---|---|---|
| Payable for related party | | | |
| Payable for engineering equipment | Company A | 400,456 | 265,597 |
| Payable for fuel | Company xxxx and other subsidiaries thereof | 68,431 | 4,586 |
| Payable for fuel | Company xxxx and area B division | 981 | -- |
| Payable for property management | Company C | 1,250 | -- |
| Payable for CDM service | Company D | 787 | 787 |
| Payable for repairment | Company E | 45 | 624 |
| | Company FFF and Company G | | |
| Payable for capacity index | Company H | 273,530 | 99,500 |
| Other payables | Company JJJ and Company K | 1,060 | 195,101 |
| Pre-collected of electricity sales rights | Company L | 10,000 | 10,000 |
| Shareholder loan | Company M | 3,020,023 | 3,210,396 |
| | Company N | | |
| Other loans | Company Q | 7,155,505 | 6,980,185 |
| | Company RRR and Company S | | |
| Finance lease payable | Company T | 227,500 | -- |

Fig. 6

| Project name | Related party | 2012 | 2011 |
|---|---|---|---|
| | | Thousand Yuan | Thousand Yuan (Restate) |
| Payable for related party | | | |
| Payable for engineering equipment | Company A | (100,456) | (268,597) |
| Payable for fuel | Company xxxx and other subsidiaries thereof | (8,431) | (1,586) |
| Payable for fuel | Company xxxx and area B division | (863) | – |
| Payable for property management | Company C | (1,250) | – |
| Payable for CDM service | Company D | (787) | (787) |
| Payable for repairment | Company E | (45) | (624) |
| Payable for capacity index | Company FFF and Company G | (273,530) | (99,500) |
| Other payables | Company H | (1,060) | (193,101) |
| | Company JJJ and Company K | | |
| Pre-collected of electricity sales rights | Company L | (10,000) | (10,000) |
| Shareholder loan | Company M | (3,020,023) | (3,240,396) |
| Other loans | Company N | (7,155,505) | (6,986,085) |
| | Company Q | | |
| | Company RRR and Company S | | |
| Finance lease payable | Company T | (227,500) | – |

Fig. 7

| Project name | Related party | 2012 | 2011 |
|---|---|---|---|
| | | Thousand Yuan | Thousand Yuan (Restate) |
| Payable for related party | | | |
| Payable for engineering equipment | Company A | (400,456) | (268,597) |
| Payable for fuel | Company xxxx and other subsidiaries thereof Company xxxx and area B division | (68,431) | (1,586) |
| Payable for fuel | Company C | (863) | - |
| Payable for property management | Company D | (1,250) | - |
| Payable for CDM service | Company E | (787) | (787) |
| Payable for repairment | Company FFF and Company G | (45) | (624) |
| Payable for capacity index | Company H | (273,530) | (99,500) |
| Other payables | Company JJJ and Company K | (1,060) | (193,101) |
| Pre-collected of electricity sales rights | Company L | (10,000) | (10,000) |
| Shareholder loan | Company M Company N | (3,020,023) | (3,240,396) |
| Other loans | Company Q Company RRR and Company S | (7,155,505) | (6,986,085) |
| Finance lease payable | Company T | (227,500) | - |

Fig. 8

METHOD AND APPARATUS FOR RECOGNIZING TABLE, DEVICE, MEDIUM

CROSS-REFERENCE TO RELATED APPLICATIONS

This application claims priority to Chinese Patent Application No. 202010508011.6, filed with the China National Intellectual Property Administration (CNIPA) on Jun. 5, 2020, the contents of which is incorporated herein by reference in its entirety.

TECHNICAL FIELD

Embodiments of the present disclosure relate to the field of computer technology, specifically to the fields of data processing technology and cloud computing, and more specifically to a method and apparatus for recognizing a table, a device and a medium.

BACKGROUND

With the development of information technology, the importance of electronic tables is beyond doubt. However, tables involved during business transaction processing are not just simple Excel and Word documents, there are also many table pictures in the form of PDF scans and pictures.

Normally, it needs to manually recognize a table picture and manually extract content on the table picture to input into Excel or Word. When there are many table pictures to be processed, manual recognition and content extraction are not only inefficient, but also very error-prone. Although there are some solutions for table recognition based on deep learning schemes, the accuracy of table recognition is not ideal.

SUMMARY

Embodiments of the present disclosure provide a method and apparatus for recognizing a table, a device and a medium, to improve the accuracy of table recognition.

According to a first aspect, some embodiments of the present disclosure provide a method for recognizing a table, the method comprises:

detecting a table on a target picture, to obtain a candidate table recognition result;

extracting a merging feature of the candidate table recognition result, and determining a to-be-merged row in the candidate table recognition result based on the merging feature;

extracting a direction feature of the to-be-merged row, and determining a merging direction of the to-be-merged row based on the direction feature; and adjusting the candidate table recognition result based on the to-be-merged row and the merging direction of the to-be-merged row, to obtain a target table recognition result.

According to another aspect of the present disclosure, some embodiments of the present disclosure provide an apparatus for recognizing a table, the apparatus includes:

a candidate result determination module, configured to detect a table on a target picture, to obtain a candidate table recognition result;

a to-be-merged row determination module, configured to extract a merging feature of the candidate table recognition result, and determine a to-be-merged row in the candidate table recognition result based on the merging feature;

a merging direction determination module, configured to extract a direction feature of the to-be-merged row, and determine a merging direction of the to-be-merged row based on the direction feature; and a target result determination module, configured to adjust the candidate table recognition result based on the to-be-merged row and the merging direction of the to-be-merged row, to obtain a target table recognition result.

According to another aspect of the present disclosure, some embodiments of the present disclosure provide an electronic device, includes:

at least one processor; and a memory, communicatively connected to the at least one processor; where, the memory, storing instructions executable by the at least one processor, the instructions, when executed by the at least one processor, cause the at least one processor to perform the method for recognizing a table according to any one of embodiments of the present disclosure.

According to another aspect of the present disclosure, some embodiments of the present disclosure provide a non-transitory computer readable storage medium, storing computer instructions, the computer instructions, being used to cause the computer to perform the method for recognizing a table according to any one of embodiments of the present disclosure.

According to the technical solutions of embodiments of the present disclosure, after the candidate table recognition result is obtained by table detection, table features of the candidate table recognition result (namely the merging feature and the direction feature) are extracted, then structural merging processing is performed on the candidate table recognition result by using the extracted table features to obtain the to-be-merged row and the merging direction of the to-be-merged row, and the candidate table recognition result is further adjusted to obtain the final target table recognition result, which solve the problem of inaccurate recognition results in the existing table recognition solutions, and improve the accuracy of table recognition.

It should be understood that the content described in this section is not intended to identify the key or important features of embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to better understand the present solution, and do not constitute a limitation to the present disclosure, in which:

FIG. 2 is a schematic diagram of a candidate table recognition result of a target picture disclosed according to an embodiment of the present disclosure;

FIG. 3 is a schematic diagram of a target table recognition result of a target picture disclosed according to an embodiment of the present disclosure;

FIG. 6 is a schematic diagram of a detection result of an outer frame of a table and a text area on a target picture disclosed according to an embodiment of the present disclosure;

FIG. 7 is a schematic diagram of a column area range including a blank column on a target picture disclosed according to an embodiment of the present disclosure;

FIG. 8 is a schematic diagram of a column area range after a blank column on a target picture is merged disclosed according to an embodiment of the present disclosure;

DETAILED DESCRIPTION OF EMBODIMENTS

Example embodiments of the present disclosure will be described below in detail with reference to the accompanying drawings, various details of the embodiments of the present disclosure are included to facilitate understanding, and they should be considered as mere examples. Therefore, those of ordinary skill in the art should recognize that various changes and modifications may be made to the embodiments described herein without departing from the scope and spirit of the present disclosure. Also, for clarity and conciseness, descriptions of well-known functions and structures are omitted in the following description.

Figure 1:
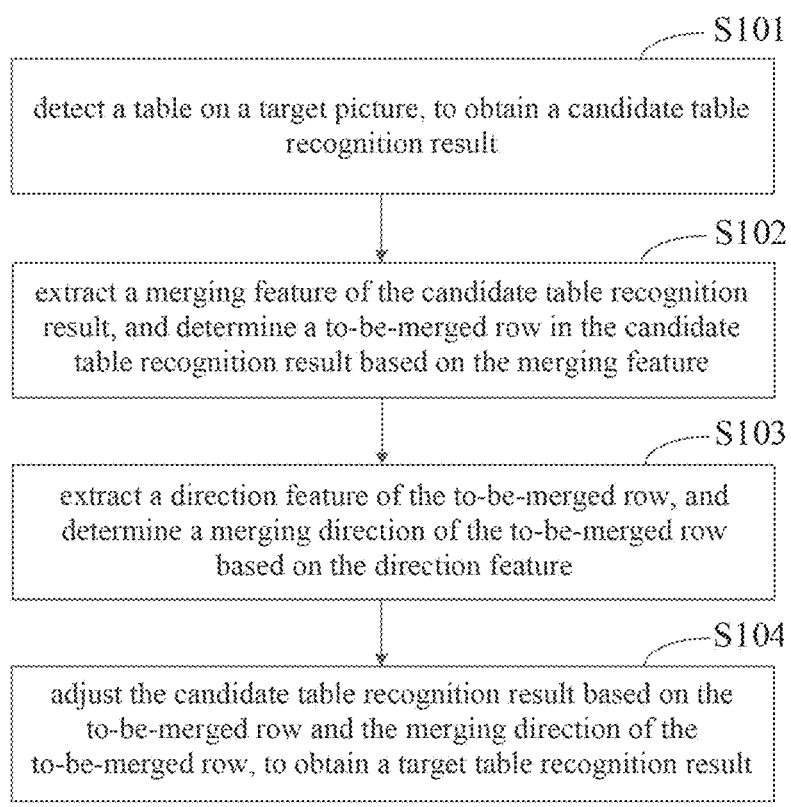
FIG. 1 is a flowchart of a method for recognizing a table disclosed according to an embodiment of the present disclosure.

FIG. 1 is a flowchart of a method for recognizing a table according to an embodiment of the present disclosure. Embodiments of the present disclosure may be applicable to the case of recognizing a table picture to obtain a table on the table picture, especially to the case of recognizing a non-border table on the table picture. The method disclosed in embodiments of the present disclosure may be performed by an apparatus for recognizing a table, which may be implemented in software and/or hardware, and may be integrated on any electronic device having computing capability, such as a server or a terminal.

As shown in FIG. 1, the method for recognizing a table disclosed in an embodiment of the present disclosure may include:

S101, detecting a table on a target picture to obtain a candidate table recognition result.

When a target picture is acquired, based on target detection technology, any neural network model having table detection function, such as a model based on convolutional neural network or a model based on residual neural network, may be used to detect the table on the target picture, and any available method having text detection effect, such as CTPN technology (a scene text detection method), TextSnake technology (a text detection method), PSENET technology (a text detection method), or CRAFT technology (a text detection method), may be used to detect text on the target picture, thereby obtaining a preliminary recognition result of the table, that is, the candidate table recognition result. Here, the target picture refers to any to-be-processed picture including a to-be-recognized table, including PDF scans and other pictures in picture formats. The table on the target picture may include a table with borders and a non-border table without borders. Preferably, for a non-border table, higher detection accuracy may be ensured. Specifically, the table on the target picture may be a corporate annual report, financial statement, etc.

As an example, the detecting a table on a target picture to obtain a candidate table recognition result, includes: detecting an outer frame of the table on the target picture and a text area on the target picture, where, after the text areas are detected, position information, such as position coordinates, of the text area on the target picture may be determined; and performing grid partition on the table on the target picture based on the outer frame of the table and the text areas, to obtain the candidate table recognition result. Each text area on the target picture refers to an area that contains at least one word and a distance between words is relatively close.

FIG. 2 takes a target picture including a non-border table as an example, and shows a schematic diagram of the candidate table recognition result of the target picture, and should not be understood as a specific limitation to the embodiment of the present disclosure. As shown in FIG. 2, after the candidate table recognition result is determined, structured information included in the table, such as cell information, row information, and column information, may all be preliminarily determined. At the same time, it may also be seen from FIG. 2 that some rows or some cells in the candidate table recognition result, such as the cell with the text content of "company xxx and" and the cell with the text content of "area B division" should essentially belong to one complete cell and corresponds to the complete text content "company xxx and area B division", need to be merged to obtain a more accurate table recognition result.

S102, extracting a merging feature of the candidate table recognition result, and determining a to-be-merged row in the candidate table recognition result based on the merging feature.

Here, the merging feature is a feature obtained according to statistical law, based on a statistical analysis on the characteristics of a large number of tables, and can be used to determine characteristics of the to-be-merged row in the table. The to-be-merged row refers to a row that needs to be integrally merged with an adjacent upper row or an adjacent lower row in a row unit.

As an example, the merging feature of the candidate table recognition result includes at least one of: a difference between the number of valid columns in each row in the candidate table recognition result and a maximum number of valid columns in the candidate table recognition result, a relative position relationship between each row in the candidate table recognition result and a header of the candidate table recognition result, whether a text area in each row in the candidate table recognition result includes a preset separator, or whether the text area in each row in the candidate table recognition result includes numeric type data. Here, the header refers to, in the candidate table recognition result, the first cell in the row corresponding to the maximum number of valid columns, where the row corresponding to the maximum number of valid columns is determined based on position information. In the candidate table recognition result, the number of valid columns in each row refers to the number of columns corresponding to text areas in the row, the maximum number of valid columns is the maximum number of columns corresponding to text areas in the table. The preset separator may be any symbol applicable in the table to separate the texts or separate the rows, such as a decimal point used to break a value.

Further, in the merging features, the difference between the number m of valid columns in each row in the candidate table recognition result and the maximum number n of valid columns in the candidate table recognition result may be expressed as: (n−m)/n, or it may also be in other mathematical calculation forms, such as the value of the quotient between m and n. The relative position relationship between each row in the candidate table recognition result and the header of the candidate table recognition result includes being above the row where the header is located and being under the row where the header is located.

After the merging feature is obtained, the to-be-merged row in the candidate table recognition result may be determined according to a predetermined association relationship between a merging feature of the table and a to-be-merged row in the table (that is, the predetermined association relationship is used to represent regularities between merging features and to-be-merged rows). Alternatively, the association relationship between a merging feature and a to-be-merged row in the table may be determined based on machine learning schemes, including but not limited to regression analysis schemes, or the like.

As an example, the greater the difference between the number of valid columns in a row in the candidate table recognition result and the maximum number of valid columns in the candidate table recognition result, the greater the probability of that this row belongs to a to-be-merged row; in the candidate table recognition result, the probability of that the row above the header is to be merged into the row where the header is located is higher; in the candidate table recognition result, the probability of that the row with text areas including a preset separator belongs to the to-be-merged row is higher; and in the candidate table recognition result, the probability of that the row with the text area including the numeric type data belongs to the to-be-merged row is higher.

S103, extracting a direction feature of the to-be-merged row, and determining a merging direction of the to-be-merged row based on the extracted direction feature.

Here, the direction feature is a feature obtained according to statistical law, based on a statistical analysis on the characteristics of a large number of tables, and can be used to determine merging direction of the to-be-merged row. The merging direction includes downward merging and upward merging. The upward merging refers to canceling an upper border of the current to-be-merged row and a lower border of the adjacent upper row; and the downward merging refers to canceling a lower border of the current to-be-merged row and an upper border of the adjacent lower row.

As an example, the direction feature of the to-be-merged row includes at least one of: whether the to-be-merged row includes a side header, whether the to-be-merged row only includes the side header, whether a text area of the to-be-merged row includes numeric type data, a ratio of a distance between the to-be-merged row and a lower border of an adjacent upper row to a distance between the to-be-merged row and an upper border of an adjacent lower row, a width difference between the text area (or text box) of the to-be-merged row and a text area of the upper row, and a width difference between the text area of the to-be-merged row and a text area of the lower row, etc. The side header refers to, in each row, the cell on the leftmost side of the table according to reading habits.

Further, in the direction features, the ratio of the distance between the to-be-merged row and the lower border of the adjacent upper row to the distance between the to-be-merged row and the upper border of the adjacent lower row, may include a ratio of a distance between the center axis of the to-be-merged row and the lower border of the adjacent upper row to a distance between the center axis of the to-be-merged row and the upper border of the adjacent lower row, or may also be a ratio of a distance between the upper border of the to-be-merged row and the lower border of the adjacent upper row to a distance between the lower border of the to-be-merged row and the upper border of the adjacent lower row;

the width difference between the text area of the to-be-merged row and the text area of the adjacent upper row may be expressed as:

$$\sum \frac{l_i - h_i}{h_i},$$

here, $h_i$ represents the width of the $i^{th}$ text area in the to-be-merged row, $l_i$ represents the width of the $i^{th}$ text area in the adjacent upper row corresponding to the $i^{th}$ text area in the to-be-merged row, and the value of i is an integer.

Similarly, the width difference between the text area of the to-be-merged row and the text area of the adjacent lower row may be expressed as:

$$\sum \frac{p_i - h_i}{h_i},$$

here, $h_i$ represents the width of the $i^{th}$ text area in the to-be-merged row, $p_i$ represents the width of the $i^{th}$ text area in the adjacent lower row corresponding to the $i^{th}$ text area in the to-be-merged row, and the value of i is an integer.

After an aforementioned width difference are obtained, the merging direction of the to-be-merged row may be determined based on the relationship between the width difference value and a difference threshold. For example, the situation that the width difference value is greater than the difference threshold may be determined to be upward merging, and the situation that the width difference value is less than or equal to the difference threshold may be determined to be downward merging. The difference threshold may be set reasonably, which is not specifically limited in embodiments of the present disclosure.

Specifically, after the direction feature is obtained, the merging direction of the to-be-merged row in the candidate table recognition result may be determined according to a predetermined association relationship between a direction feature of the table and a merging direction of the to-be-merged row (that is, the predetermined association relationship is used to represent regularities between second features and the to-be-merged rows) may be used to determine. Alternatively, the association relationship between a direction feature and a merging direction of the to-be-merged row may be determined based on machine learning schemes, including but not limited to regression analysis schemes, or the like.

As an example, when the to-be-merged row includes the side header or the to-be-merged row only includes the side header, the probability of other rows being merged into the current row is high; the greater the value of the ratio of the distance between the to-be-merged row and the lower border of the adjacent upper row to the distance between the to-be-merged row and the upper border of the adjacent lower row, then it indicates that the distance between the to-be-merged row and the adjacent upper row is smaller, and the probability of the to-be-merged row being merged into the adjacent upper row is greater than the probability of the to-be-merged row being merging into the adjacent lower row; the greater the value of the width difference between the text area of the to-be-merged row and the text area of the adjacent upper row, the greater the probability that the to-be-merged row is merged into the adjacent upper row; similarly, the greater the value of the width difference between the text area of the to-be-merged row and the text area of the adjacent lower row, the greater the probability that the to-be-merged row is merged into the adjacent lower row; and for a to-be-merged row with a text area including numeric type data, the probability of being merged into the adjacent lower row is relatively larger.

In addition, in embodiments of the present disclosure, for a feature that need to be judged for its types, it may be agreed in advance that adopting different character representations for features of different branch types, so as to facilitate a recording of the table features of the candidate table recognition result, and further facilitate subsequent table structured processing. In the merging features, taking the relative position relationship between each row in the candidate table recognition result and the header of the candidate table recognition result as an example, if a row is above the header, the feature of the row may be recorded as 1, if the row is below the header, the feature of the row may be recorded as 0. If the text area of a row in the candidate table recognition result includes a preset separator, the feature of the row may be recorded as 1, otherwise it is recorded as 0. For features of other dimensions, the aforementioned recording method is also applicable, and similarly, it is also applicable to the direction feature. For example, if the to-be-merged row includes a side header, the feature of the to-be-merged row is recorded as 1, otherwise, it is recorded as 0.

Sub-features respectively included in the merging feature of the candidate table recognition result and the merging direction of the to-be-merged row may be used alone or in combination to determine the to-be-merged row and the merging direction. From the perspective of ensuring a high-quality result, the combination of the sub-features is preferred, that is, a comprehensive decision is made by considering a plurality of sub-features.

S104, adjusting the candidate table recognition result based on the to-be-merged row and the merging direction of the to-be-merged row, to obtain a target table recognition result.

The candidate table recognition result is adjusted based on the determined to-be-merged row and the merging direction of the to-be-merged row, thereby obtaining an accurate target table recognition result. FIG. 3 takes a non-border table included in the target picture as an example, showing a schematic diagram of the target table recognition result of the target picture, which should not be interpreted as a specific limitation to embodiments of the present disclosure. Compared with FIG. 2, FIG. 3 merges some rows in the table to make the table recognition result more accurate.

In addition, after the target table recognition result is obtained, text recognition technology, such as OCR (optical character recognition) technology, may be further used to recognize text in each text area, and then the recognized text may be extracted into an editable document, such as a Word or Excel document, so as to realize convenient extraction of the content on the table picture. Word or Excel documents may be exported and fed back to users.

According to the technical solution of the embodiment of the present disclosure, after the candidate table recognition result is obtained by table detection, table features of the candidate table recognition result, namely the merging feature and the direction feature, are extracted, then structuralized merging processing is performed on the candidate table recognition result based on the extracted table features to obtain the to-be-merged row and the merging direction of the to-be-merged row, and to further adjust the candidate table recognition result to obtain the final target table recognition result, which solves the problem of inaccurate recognition results in the existing table recognition solutions, and improves the accuracy of table recognition.

It should be noted that in embodiments of the present disclosure, the timing for extracting the merging feature and the direction feature is not strictly limited, and the execution orders of the operation of extracting the merging feature and the direction feature and other operations illustrated in FIG. 1 should not be understood as a specific limitation to embodiments of the present disclosure. For example, the direction feature of each row in the table may be extracted at the same time when the merging feature is extracted based on the candidate table recognition result, then, after the to-be-merged row in the candidate table recognition result is determined, the direction feature of the to-be-merged row is directly called to determine the merging direction of the to-be-merged row.

Figure 4:
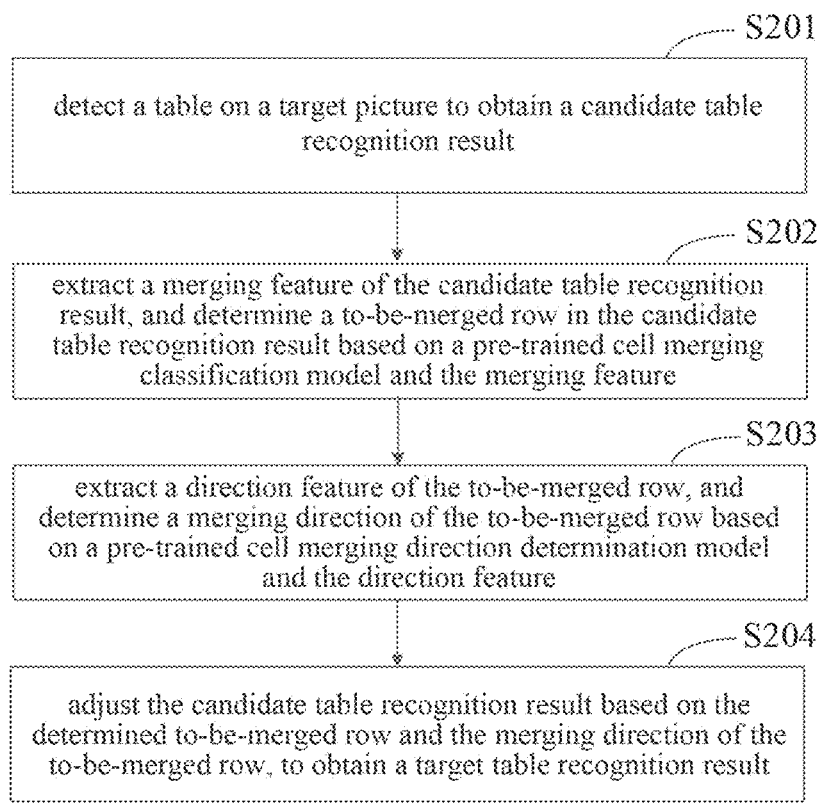
FIG. 4 is a flowchart of another method for recognizing a table disclosed according to an embodiment of the present disclosure.

FIG. 4 illustrates a flowchart of a method for recognizing a table according to another embodiment of the present disclosure. The method further optimizes and expands the above technical solution, and may be combined with the above various alternative embodiments. As shown in FIG. 4, the method may include:

S201, detecting a table on a target picture to obtain a candidate table recognition result.

S202, extracting a merging feature of the candidate table recognition result, and determining a to-be-merged row in the candidate table recognition result based on a pre-trained cell merging classification model and the merging feature.

S203, extracting a direction feature of the to-be-merged row, and determining a merging direction of the to-be-merged row based on a pre-trained cell merging direction determination model and the direction feature.

S204, adjusting the candidate table recognition result based on the determined to-be-merged row and the merging direction of the to-be-merged row, to obtain a target table recognition result.

The cell merging classification model may be any pre-trained model that can be used to determine whether each row in the candidate table recognition result needs to participate in the merging. Specifically, the model may be a binary classification model, that is, an output result of the model for each row may include: need to participate in the merging or no need to participate in the merging. The cell merging direction determination model may be any pre-trained model that can be used to determine the merging direction of the to-be-merged row, and specifically, it may also be a binary classification model, that is, an output result of the model for each to-be-merged row may include: upward merging or downward merging. The upward merging refers to canceling an upper border of the current to-be-merged row and a lower border of the adjacent upper row; and the downward merging refers to canceling a lower border of the current to-be-merged row and an upper border of the adjacent lower row.

Based on the foregoing technical solution, alternatively, the method disclosed in embodiments of the present disclosure further includes training the models:

acquiring a preset number of sample tables, and labeling to-be-merged rows in the sample tables and merging directions of the to-be-merged rows. For example, the to-be-merged rows in the sample tables may be marked as 1, and the rows that do not need to be merged may be marked as 0. The merging direction which is upward merging is marked as 1, and the merging direction which is downward merging is marked as 0;

extracting sample merging features used to determine the to-be-merged rows in the sample tables, and extracting sample direction features used to determine the merging directions of the to-be-merged rows in the sample tables;

training to obtain the cell merging classification model by using the labeled to-be-merged rows and the sample merging features; that is, during the training, an association relationship between the to-be-merged rows and the sample merging features can be learned, so as to be used for predicting the to-be-merged rows; and training to obtain the cell merging direction determination model by using the merging directions of the labeled to-be-merged rows and the sample direction features; that is, during the training, an association relationship between the merging directions of the to-be-merged rows and the sample direction features can be learned, so as to be used for predicting the merging directions of the to-be-merged rows.

Similarly, during training the models, the sample merging features and the sample direction features may be extracted at the same time; it is also possible to extract the sample merging features first, and then extract the sample direction features, which is not specifically limited in the embodiment of the present disclosure. During recognizing the tables, the cell merging classification model and the cell merging direction determination model may be used alternatively or simultaneously, which may be determined depending on the processing requirements. The technical solution shown in FIG. 4 should not be understood as a specific limitation to embodiments of the present disclosure.

As an example, the sample merging feature includes at least one of: a difference between the number of valid columns in each row in a sample table and a maximum number of valid columns in the sample table, a relative position relationship between each row in the sample table and a header of the sample table, whether a text area in each row in the sample table includes a preset separator, or whether the text area in each row in the sample table includes numeric type data, etc. Here, the header refers to, in a sample table, the first cell in a row corresponding to the maximum number of valid columns determined based on position information. In a sample table, the number of valid columns in each row refers to the number of columns corresponding to text areas in the row, the maximum number of valid columns is the maximum number of columns corresponding to text areas in the table. The preset separator may be any symbol applicable in the table to separate the texts into rows, such as a decimal point used to break a value.

The sample direction feature includes at least one of: whether the to-be-merged row includes a side header, whether the to-be-merged row only includes the side header, whether a text area of the to-be-merged row includes numeric type data, a ratio of a distance between the to-be-merged row and a lower border of an adjacent upper row to a distance between the to-be-merged row and an upper border of an adjacent lower row, a width difference between the text area of the to-be-merged row and a text area of the adjacent upper row, and a width difference between the text area of the to-be-merged row and a text area of the adjacent lower row, etc. The side header refers to, in each row, the cell on the leftmost side of the table according to reading habits. The extraction of features in the model training phase and the extraction of features in the model usage phase belong to the same logic. Therefore, for other descriptions of a first sample feature and a second feature, reference may be made to the description of the first feature and the second feature of the candidate table recognition result in the foregoing embodiments, and detailed description thereof will be omitted.

During the training of the cell merging classification model and the cell merging direction determination model, the models may both be obtained by training based on the logistic regression binary classification scheme, GBDT (gradient boosting decision tree) binary classification scheme, XGBoost (eXtreme gradient boosting) binary classification scheme or SVM (support vector machine) binary classification scheme, etc.; automated modeling may be combined to optimize model parameters to obtain the required model; a model fusion method may also be used to train to obtain the required model. Embodiments of the present disclosure do not limit the specific training realization process of the model.

According to the technical solution of the embodiment of the present disclosure, after the candidate table recognition result is obtained through table detection, the merging feature and the direction feature of the candidate table recognition result are extracted, which lays a data foundation for subsequent obtaining of an accurate table recognition result; then, the pre-trained cell merging classification model and the merging feature are used to determine a to-be-merged row in the candidate table recognition result, and the pre-trained cell merging direction determination model and the direction feature are used to determine the merging direction of the to-be-merged row; and finally, based on the determined to-be-merged row, the merging direction and the candidate table recognition result, an accurate target table recognition result is obtained, which solves the problem of inaccurate recognition results in the existing table recognition solutions, and improves the accuracy of table recognition. In addition, the use of the cell merging classification model and the cell merging direction determination model improves the efficiency of table recognition while ensures the accuracy and reliability of table recognition results, effectively, and makes the solution more widely applicable.

Figure 5:
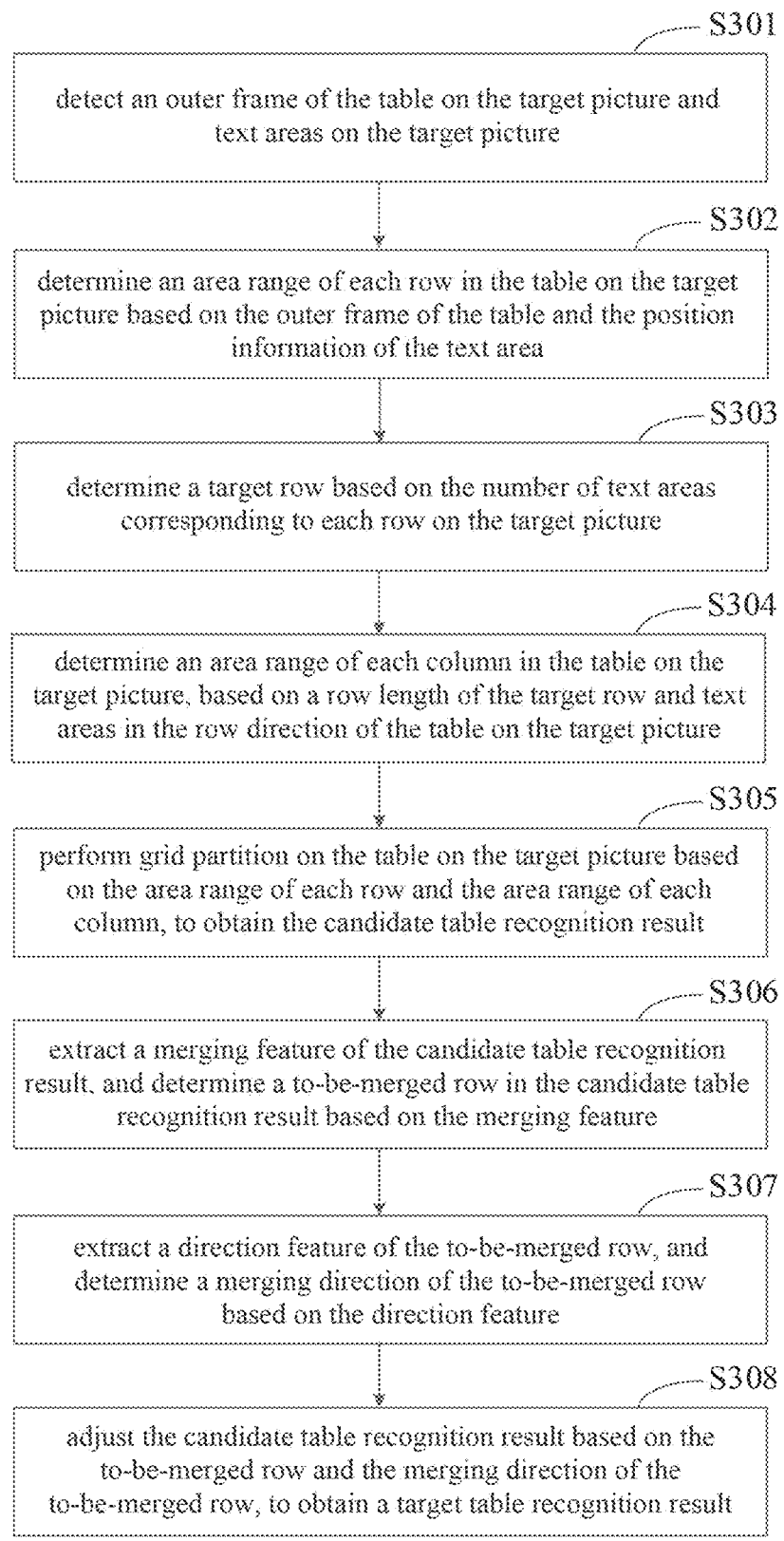
FIG. 5 is a flowchart of another method for recognizing a table disclosed according to an embodiment of the present disclosure.

FIG. 5 is a flowchart of a method for recognizing a table according to another embodiment of the present disclosure. The method further optimizes and expands the above technical solution, and may be combined with the above various alternative embodiments. As shown in FIG. 5, the method may include:

S301, detecting an outer frame of the table on the target picture and text areas on the target picture.

As an example, the outer frame of the table on the target picture may be detected by using a preset neural network model. The preset neural network model may be realized by adding a preset number of convolutional layers to a Yolov3 network structure. The preset neural network model is obtained by model training and has the function of detecting the outer frame of a table. Parameters required in the model training may be flexibly set according to detection requirements. Specifically, after the target picture is processed by the Yolov3 network structure, a result is not directly output but is input into the preset number (the specific value depends on the actual demand) of convolution layers for convolution calculation, and then through a fully connected layer the detection result of the outer frame of the table is output, which may improve the detection accuracy of the outer frame of the table compared to the case where the detection result of the outer frame of the table is directly output through the Yolov3 network structure. At the same time, compared to the scheme of using the Faster R-CNN network to detect the outer frame of the table, the preset neural network model used in embodiments of the present disclosure may also improve the accuracy of table detection, and may reduce the misrecognition of some other loose texts as table area, taking into account the accuracy of table recognition and a recall rate. In addition, the time consumed by the model training and model prediction are much less than those of the Faster R-CNN. During the model training of the preset neural network model, a cross-entropy loss function may be used as the model loss function to ensure the accuracy of model training. The specific form of the cross-entropy loss function may be realized with reference to the function form in the prior art.

Further, a CRAFT (character region awareness for text detection) method may be used to detect text areas on the target picture. The core idea of the CRAFT method is: to propose a method for detecting a single character region and affinity between characters, which is more in line with the core concept of target detection, instead of taking text boxes as targets, so that large text and long text can also be predicted using a small perception field-of-view. By focusing on the character region content only, instead of the entire text instance, a text boundary can be effectively obtained and the accuracy of text area detection on the target picture may be ensured.

FIG. 6 is a schematic diagram of a detection result of an outer frame of a table and a text area on a target picture disclosed according to an embodiment of the present disclosure. As shown in FIG. 6, text in the outer frame of the table belongs to the content of the table. One text area corresponds to one text box, and the number of text boxes is determined by the content of the table. The size of the outer frame of the table and each text box may be set adaptively.

Further, during detecting an outer frame of the table on the target picture, the method disclosed in embodiments of the present disclosure further includes: detecting a table name of the table on the target picture; and correspondingly, after detecting the outer frame of the table on the target picture, the method disclosed in embodiments of the present disclosure further includes: adjusting the outer frame of the table based on position information of the table name, to avoid partitioning the area occupied by the table name into the table area, thereby improving the detection accuracy of the outer frame of the table.

As an example, regarding the realization of table name detection: the table name detection may be used as a training target during training to obtain the preset neural network model having the function of detecting an outer frame of a table, that is, a training sample table is labeled with the table outer frame and the table name at the same time and then used for model training, so that the trained preset neural network model may be a multi-task model, having both functions of detecting the table outer frame and the table name. In addition, the position of the table name may also be detected based on, respectively, a position relationship between the table name and the table body and a position relationship between the table name and the header.

S302, determining an area range of each row in the table on the target picture based on the outer frame of the table and the position information of the text area. That is, determining an upper boundary and a lower boundary of each row.

S303, determining a target row based on the number of text areas corresponding to each row on the target picture.

Specifically, taking the rows of the table on the target picture as units, and a row with the number of text areas corresponding thereto exceeding a number threshold, for example, the row with the largest number of text areas corresponding thereto, may be determined as the target row. One text area in each row may correspond to one column. In other words, the number of columns corresponding to the target row is the largest to a certain extent.

S304, determining an area range of each column in the table on the target picture, based on a row length of the target row and text areas in the row direction of the table on the target picture.

Specifically, the table area may be reasonably partitioned along the column direction of the table according to the range of all text areas in the row direction of the table, to determine a left boundary line and a right boundary line of each column.

S305, performing grid partition on the table on the target picture based on the area range of each row and the area range of each column, to obtain the candidate table recognition result.

Reference may be made to FIG. 2 for a schematic effect of the candidate table recognition result.

S306, extracting a merging feature of the candidate table recognition result, and determining a to-be-merged row in the candidate table recognition result based on the merging feature.

S307, extracting a direction feature of the to-be-merged row, and determining a merging direction of the to-be-merged row based on the direction feature.

S308, adjusting the candidate table recognition result based on the to-be-merged row and the merging direction of the to-be-merged row, to obtain a target table recognition result.

On the basis of the above technical solution, further, the determining the area range of each column in the table on the target picture based on a row length of the target row and a text area in a table row direction on the target picture, includes:

determining a candidate area range of each column in the table on the target picture based on the row length of the target row and the text areas in the row direction of the table on the target picture;

detecting a blank column that does not include a text area, based on the candidate area range of each column; and merging a candidate area range of the blank column into target areas of two columns to obtain a target area range of each column in the table on the target picture; where, the target areas of two columns refer to areas of columns adjacent to the blank column and respectively located on different sides of the blank column.

As an example, the second, fourth, and sixth columns in FIG. 7 are blank columns. Blank columns should not show up in a normal table. Therefore, for the accuracy of table recognition, a blank column area needs to be merged into the columns on the left and right sides of the blank columns, such as the column area range shown in FIG. 8, to obtain a more reasonable and accurate table recognition result.

According to the technical solution of embodiments of the present disclosure, by performing table outer frame detection and text area detection on the target picture, the row area range and the column area range of the table on the target picture are determined, and the candidate table recognition result is preliminarily obtained, which lays a foundation for subsequent effective table structuring processing; then performing feature extraction based on the candidate table recognition result, and the extracted features are used to determine the to-be-merged row and the merging direction of the to-be-merged row, so as to realize the effective structuring processing of the candidate table recognition result, to obtain an accurate target table recognition result, which solves the problem of inaccurate recognition results in the existing table recognition solutions, and improves the accuracy of table recognition.

Figure 9:
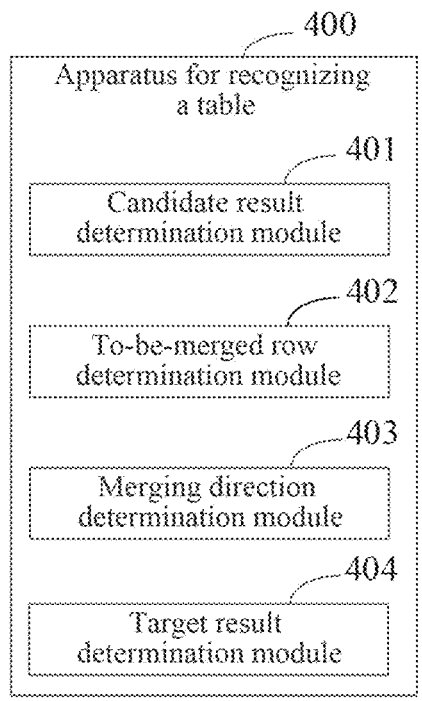
FIG. 9 is a schematic structural diagram of an apparatus for recognizing a table disclosed according to an embodiment of the present disclosure.

FIG. 9 is a schematic structural diagram of an apparatus for recognizing a table disclosed according to an embodiment of the present disclosure. The embodiment of the present disclosure may be applicable to the case of recognizing a table picture to obtain the table on the table picture, especially the case of recognizing a border table with borders on the table picture. The apparatus disclosed in the embodiment of the present disclosure may be implemented in software and/or hardware, and may be integrated on any electronic device having computing capability, such as a server or a terminal.

As shown in FIG. 9, an apparatus 400 for recognizing a table disclosed in the embodiment of the present disclosure may include a candidate result determination module 401, a to-be-merged row determination module 402, a merging direction determination module 403, and a target result determination module 404, where:

the candidate result determination module 401, configured to detect a table on a target picture, to obtain a candidate table recognition result;

the to-be-merged row determination module 402, configured to extract a merging feature of the candidate table recognition result, and determine a to-be-merged row in the candidate table recognition result based on the merging feature;

the merging direction determination module 403, configured to extract a direction feature of the to-be-merged row, and determine a merging direction of the to-be-merged row based on the direction feature; and the target result determination module 404, configured to adjust the candidate table recognition result based on the to-be-merged row and the merging direction of the to-be-merged row, to obtain a target table recognition result.

Alternatively, the to-be-merged row determination module 402 includes:

a merging feature extraction unit, configured to extract the merging feature of the candidate table recognition result; and a to-be-merged row determination unit, configured to determine the to-be-merged row in the candidate table recognition result based on a pre-trained cell merging classification model and the merging feature.

Alternatively, the merging direction determination module 403 includes:

a direction feature extraction unit, configured to extract the direction feature of the to-be-merged row; and a merging direction determination unit, configured to determine the merging direction of the to-be-merged row based on a pre-trained cell merging direction determination model and the direction feature, where the merging direction comprises downward merging and upward merging.

Alternatively, the merging feature includes at least one of: a difference between a number of valid columns in each row in the candidate table recognition result and a maximum number of valid columns in the candidate table recognition result, a relative position relationship between each row in the candidate table recognition result and a header of the candidate table recognition result, whether a text area in each row in the candidate table recognition result comprises a preset separator, or whether the text area in each row in the candidate table recognition result comprises numeric type data; and the direction feature includes at least one of: whether the to-be-merged row comprises a side header, whether the to-be-merged row only comprises the side header, whether a text area of the to-be-merged row comprises numeric type data, a ratio of a distance between the to-be-merged row and a lower border of an adjacent upper row to a distance between the to-be-merged row and an upper border of an adjacent lower row, a width difference between the text area of the to-be-merged row and a text area of the upper row, or a width difference between the text area of the to-be-merged row and a text area of the lower row;

where, the header refers to a first cell in a row corresponding to the maximum number of valid columns determined based on position information in the candidate table recognition result.

Alternatively, the apparatus disclosed according to an embodiment of the present disclosure further includes:

a sample labeling module, configured to acquire a preset number of sample tables, and label to-be-merged rows in the sample tables and merging directions of the to-be-merged rows;

a sample feature extraction module, configured to extract sample merging features in the sample tables used to determine the to-be-merged rows, and extract sample direction features in the sample tables used to determine the merging directions of the to-be-merged rows;

a first training module, configured to train to obtain the cell merging classification model based on the labeled to-be-merged rows and the sample merging features; and a second training module, configured to train to obtain the cell merging direction determination model based on the merging directions of the labeled to-be-merged rows and the sample direction features.

Alternatively, the candidate result determination module 401 includes:

an outer frame and text detection unit, configured to detect an outer frame of the table on the target picture and text areas on the target picture; and a candidate result determination unit, configured to perform grid partition on the table on the target picture based on the outer frame of the table and the text areas, to obtain the candidate table recognition result.

Alternatively, the candidate result determination unit includes:

a row area determination subunit, configured to determine, based on the outer frame of the table and position information of the text areas, an area range of each row in the table on the target picture;

a target row determination subunit, configured to determine a target row based on a number of text areas corresponding to each row on the target picture;

a column area determination subunit, configured to determine an area range of each column in the table on the target picture, based on a row length of the target row and text areas in a row direction of the table on the target picture; and a grid partition subunit, configured to perform grid partition on the table on the target picture based on the area range of each row and the area range of each column, to obtain the candidate table recognition result.

Alternatively, the column area determination subunit includes:

a candidate area determination subunit, configured to determine, based on the row length of the target row and the text areas in the row direction of the table on the target picture, a candidate area range of each column of the table on the target picture;

a blank column detection subunit, configured to detect, based on the candidate area range of each column, a blank column not including a text area; and a target area determination subunit, configured to merge a candidate area range of the blank column into target areas of two columns to obtain a target area range of each column in the table on the target picture, wherein the target areas of the two columns refer to areas of columns adjacent to the blank column and respectively located on different sides of the blank column.

Alternatively, the outer frame and text detection unit includes:

a table outer frame detection subunit, configured to detect the outer frame of the table on the target picture;

a text area detection subunit, configured to detect the text areas on the target picture;

where, the table outer frame detection subunit is specifically configured to:

detect the outer frame of the table on the target picture by using a preset neural network model, wherein the preset neural network model is realized by adding a preset number of convolutional layers to a Yolov3 network structure.

Alternatively, the candidate result determination module 401 further includes:

a table name detection unit, configured to detect a table name of the table on the target picture; and an outer frame adjustment unit, configured to, after the outer frame and text detection unit detects the outer frame of the table on the target picture, adjust the outer frame of the table based on position information of the table name.

The apparatus 400 for recognizing a table disclosed in embodiments of the present disclosure may perform any method for recognizing a table disclosed in embodiments of the present disclosure, and has corresponding functional modules for performing the method and beneficial effects thereof. For content not described in detail in the apparatus embodiments of the present disclosure, reference may be made to the description in any method embodiment of the present disclosure.

According to an embodiment of the present disclosure, some embodiments of the present disclosure provide an electronic device and a readable storage medium.

Figure 10:
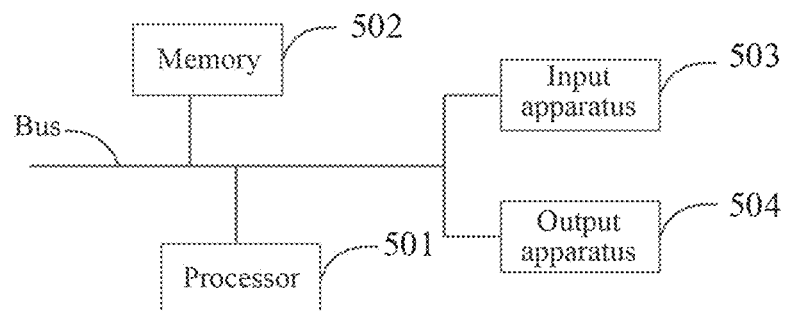
FIG. 10 is a block diagram of an electronic device disclosed according to an embodiment of the present disclosure.

As shown in FIG. 10, a block diagram of an electronic device used to implement the method for recognizing a table in embodiments of the present disclosure is illustrated. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the embodiments of the present disclosure described and/or claimed herein.

As shown in FIG. 10, which is a block diagram of an electronic device of a method for recognizing a table according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 10, the electronic device includes: one or more processors 501, a memory 502, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI (Graphical User Interface) on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 10, one processor 501 is used as an example.

The memory 502 is a non-transitory computer readable storage medium provided by an embodiment of the present disclosure. The memory stores instructions executable by at least one processor, so that the at least one processor performs the method for processing parking provided by some embodiments of the present disclosure. The non-transitory computer readable storage medium of the present disclosure stores computer instructions for causing a computer to perform the method for recognizing a table provided by embodiments of the present disclosure.

The memory 502, as a non-transitory computer readable storage medium, may be used to store non-transitory software programs, non-transitory computer executable programs and modules, such as program instructions/modules corresponding to the method for processing parking in the embodiments of the present disclosure, for example, the candidate result determination module 401, the to-be-merged row determination module 402, the merging direction determination module 403, and the target result determination module 404 shown in FIG. 9. The processor 501 executes the non-transitory software programs, instructions, and modules stored in the memory 502 to execute various functional applications and data processing of the server, that is, to implement the method for recognizing a table in the foregoing method embodiment.

The memory 502 may include a storage program area and a storage data area, where the storage program area may store an operating system and at least one function required application program; and the storage data area may store data created by the use of the electronic device according to the method for processing parking, etc. In addition, the memory 502 may include a high-speed random access memory, and may also include a non-transitory memory, such as at least one magnetic disk storage device, a flash memory device, or other non-transitory solid-state storage devices. In some embodiments, the memory 502 may optionally include memories remotely provided with respect to the processor 501, and these remote memories may be connected to the electronic device of the method for processing parking through a network. Examples of the above network include but are not limited to the Internet, intranet, local area network, mobile communication network, and combinations thereof.

The electronic device of the method for processing parking may further include: an input apparatus 503 and an output apparatus 504. The processor 501, the memory 502, the input apparatus 503, and the output apparatus 504 may be connected through a bus or in other methods. In FIG. 10, connection through a bus is used as an example.

The input apparatus 503 may receive input digital or character information, and generate key signal inputs related to user settings and function control of the electronic device of the method for recognizing a table, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solutions of embodiments of the present disclosure, after the candidate table recognition result is obtained by table detection, table features of the candidate table recognition result, namely the merging feature and the direction feature, are extracted, then structure merging processing is performed on the candidate table recognition result by using the extracted table features to obtain the to-be-merged row and the merging direction of the to-be-merged row, and the candidate table recognition result is further adjusted to obtain the final target table recognition result, which solves the problem of inaccurate recognition results in the existing table recognition solutions, and improves the accuracy of table recognition.

It should be understood that the various forms of processes shown above may be used to reorder, add, or delete steps. For example, the steps described in some embodiments of the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for recognizing a table, comprising:
   detecting a table on a target picture, to obtain a candidate table recognition result;
   extracting a merging feature of the candidate table recognition result, and determining a to-be-merged row in the candidate table recognition result based on the merging feature;
   extracting a direction feature of the to-be-merged row, and determining a merging direction of the to-be-merged row based on a pre-trained cell merging direction determination model and the direction feature, wherein the merging direction comprises downward merging and upward merging, wherein the pre-trained cell merging direction determination model is a binary classification model and is configured to determine the merging direction of the to-be-merged row, and an output result of the binary classification model for each to-be-merged row comprises: the upward merging, or the downward merging; and adjusting the candidate table recognition result based on the to-be-merged row and the merging direction of the to-be-merged row, to obtain a target table recognition result.

2. The method according to claim 1, wherein the determining the to-be-merged row in the candidate table recognition result based on the merging feature, comprises:

determining the to-be-merged row in the candidate table recognition result based on a pre-trained cell merging classification model and the merging feature.

3. The method according to claim 1, wherein:

the merging feature comprises at least one of: a difference between a number of valid columns in each row in the candidate table recognition result and a maximum number of valid columns in the candidate table recognition result, a relative position relationship between each row in the candidate table recognition result and a header of the candidate table recognition result, whether a text area in each row in the candidate table recognition result comprises a preset separator, or whether the text area in each row in the candidate table recognition result comprises numeric type data; and the direction feature comprises at least one of: whether the to-be-merged row comprises a side header, whether the to-be-merged row only comprises the side header, whether a text area of the to-be-merged row comprises numeric type data, a ratio of a distance between the to-be-merged row and a lower border of an adjacent upper row to a distance between the to-be-merged row and an upper border of an adjacent lower row, a width difference between the text area of the to-be-merged row and a text area of the upper row, or a width difference between the text area of the to-be-merged row and a text area of the lower row;

wherein the header refers to a first cell in a row corresponding to the maximum number of valid columns determined based on position information in the candidate table recognition result.

4. The method according to claim 1, wherein the detecting the table on the target picture to obtain the candidate table recognition result comprises:

detecting an outer frame of the table on the target picture and text areas on the target picture; and performing grid partition on the table on the target picture based on the outer frame of the table and the text areas, to obtain the candidate table recognition result.

5. The method according to claim 4, wherein the performing grid partition on the table on the target picture based on the outer frame of the table and the text areas, to obtain the candidate table recognition result, comprises:

determining, based on position information of the outer frame of the table and position information of the text areas, an area range of each row in the table on the target picture;

determining a target row based on a number of text areas corresponding to each row on the target picture;

determining an area range of each column in the table on the target picture, based on a row length of the target row and text areas in a row direction of the table on the target picture; and performing grid partition on the table on the target picture based on the area range of each row and the area range of each column, to obtain the candidate table recognition result.

6. The method according to claim 5, wherein, the determining the area range of each column in the table on the target picture, based on the row length of the target row and the text areas in the row direction of the table on the target picture, comprises:

determining, based on the row length of the target row and the text areas in the row direction of the table on the target picture, a candidate area range of each column of the table on the target picture;

detecting, based on the candidate area range of each column, a blank column not including a text area; and merging a candidate area range of the blank column into target areas of two columns to obtain a target area range of each column in the table on the target picture, wherein the target areas of the two columns refer to areas of columns adjacent to the blank column and respectively located on different sides of the blank column.

7. The method according to claim 4, wherein the detecting an outer frame of the table on the target picture comprises:

detecting the outer frame of the table on the target picture by using a preset neural network model, wherein the preset neural network model is realized by adding a preset number of convolutional layers to a Yolov3 network structure.

8. The method according to claim 4, wherein during the detecting the outer frame of the table on the target picture, the method further comprises:

detecting a table name of the table on the target picture; and correspondingly, after detecting the outer frame of the table on the target picture, the method further comprises: adjusting the outer frame of the table based on position information of the table name.

9. An electronic device comprising:

at least one processor; and a memory communicatively connected to the at least one processor; wherein, the memory stores instructions executable by the at least one processor that, when executed by the at least one processor, cause the at least one processor to perform operations comprising:

detecting a table on a target picture, to obtain a candidate table recognition result;

extracting a merging feature of the candidate table recognition result, and determining a to-be-merged row in the candidate table recognition result based on the merging feature;

extracting a direction feature of the to-be-merged row, and determining a merging direction of the to-be-merged row based on a pre-trained cell merging direction determination model and the direction feature, wherein the merging direction comprises downward merging and upward merging, wherein the pre-trained cell merging direction determination model is a binary classification model and is configured to determine the merging direction of the to-be-merged row, and an output result of the binary classification model for each to-be-merged row comprises: the upward merging, or the downward merging; and adjusting the candidate table recognition result based on the to-be-merged row and the merging direction of the to-be-merged row, to obtain a target table recognition result.

10. The device according to claim 9, wherein the determining the to-be-merged row in the candidate table recognition result based on the merging feature, comprises:

determining the to-be-merged row in the candidate table recognition result based on a pre-trained cell merging classification model and the merging feature.

11. The device according to claim 9, wherein:
the merging feature comprises at least one of: a difference between a number of valid columns in each row in the candidate table recognition result and a maximum number of valid columns in the candidate table recognition result, a relative position relationship between each row in the candidate table recognition result and a header of the candidate table recognition result, whether a text area in each row in the candidate table recognition result comprises a preset separator, or whether the text area in each row in the candidate table recognition result comprises numeric type data; and
the direction feature comprises at least one of: whether the to-be-merged row comprises a side header, whether the to-be-merged row only comprises the side header, whether a text area of the to-be-merged row comprises numeric type data, a ratio of a distance between the to-be-merged row and a lower border of an adjacent upper row to a distance between the to-be-merged row and an upper border of an adjacent lower row, a width difference between the text area of the to-be-merged row and a text area of the upper row, or a width difference between the text area of the to-be-merged row and a text area of the lower row;
wherein the header refers to a first cell in a row corresponding to the maximum number of valid columns determined based on position information in the candidate table recognition result.

12. The device according to claim 9, wherein the detecting the table on the target picture to obtain the candidate table recognition result comprises:
detecting an outer frame of the table on the target picture and text areas on the target picture; and
performing grid partition on the table on the target picture based on the outer frame of the table and the text areas, to obtain the candidate table recognition result.

13. The device according to claim 12, wherein the performing grid partition on the table on the target picture based on the outer frame of the table and the text areas, to obtain the candidate table recognition result, comprises:
determining, based on position information of the outer frame of the table and position information of the text areas, an area range of each row in the table on the target picture;
determining a target row based on a number of text areas corresponding to each row on the target picture;
determining an area range of each column in the table on the target picture, based on a row length of the target row and text areas in a row direction of the table on the target picture; and
performing grid partition on the table on the target picture based on the area range of each row and the area range of each column, to obtain the candidate table recognition result.

14. The device according to claim 13, wherein, the determining the area range of each column in the table on the target picture, based on the row length of the target row and the text areas in the row direction of the table on the target picture, comprises:
determining, based on the row length of the target row and the text areas in the row direction of the table on the target picture, a candidate area range of each column of the table on the target picture;
detecting, based on the candidate area range of each column, a blank column not including a text area; and
merging a candidate area range of the blank column into target areas of two columns to obtain a target area range of each column in the table on the target picture, wherein the target areas of the two columns refer to areas of columns adjacent to the blank column and respectively located on different sides of the blank column.

15. The device according to claim 12, wherein the detecting an outer frame of the table on the target picture comprises:
detecting the outer frame of the table on the target picture by using a preset neural network model, wherein the preset neural network model is realized by adding a preset number of convolutional layers to a Yolov3 network structure.

16. The device according to claim 12, wherein during the detecting the outer frame of the table on the target picture, the method further comprises:
detecting a table name of the table on the target picture; and
correspondingly, after detecting the outer frame of the table on the target picture, the operations further comprise: adjusting the outer frame of the table based on position information of the table name.

17. A non-transitory computer readable storage medium storing computer instructions that, when executed by a computer, cause the computer to perform operations comprising:
detecting a table on a target picture, to obtain a candidate table recognition result;
extracting a merging feature of the candidate table recognition result, and determining a to-be-merged row in the candidate table recognition result based on the merging feature;
extracting a direction feature of the to-be-merged row, and determining a merging direction of the to-be-merged row based on a pre-trained cell merging direction determination model and the direction feature, wherein the merging direction comprises downward merging and upward merging, wherein the pre-trained cell merging direction determination model is a binary classification model and is configured to determine the merging direction of the to-be-merged row, and an output result of the binary classification model for each to-be-merged row comprises: the upward merging, or the downward merging; and
adjusting the candidate table recognition result based on the to-be-merged row and the merging direction of the to-be-merged row, to obtain a target table recognition result.

* * * * *